United States Patent [19]

Dorries et al.

[11] Patent Number: 4,535,031

[45] Date of Patent: Aug. 13, 1985

[54] MODIFIED AMINOPLAST, ITS PREPARATION AND ITS USE

[75] Inventors: Peter Dorries, Frankfurt am Main; Thomas Götze, Neuenhain; Steffen Piesch, Oberursel; Manfred Schön, Rodgau; Günther Wulff, Hoisdorf; Karl Hintermeier, Frankfurt am Main; Günther Wulff, Hoisdorf; Karl Hintermeier, Frankfurt am Main, all of Fed. Rep. of Germany

[73] Assignee: Cassella Aktiengesellschaft, Frankfurt am Main, Fed. Rep. of Germany

[21] Appl. No.: 586,108

[22] Filed: Mar. 5, 1984

Related U.S. Application Data

[63] Continuation of Ser. No. 371,070, Apr. 23, 1982, abandoned.

[30] Foreign Application Priority Data

Jun. 30, 1981 [DE] Fed. Rep. of Germany ....... 3125615

[51] Int. Cl.³ ................. B32B 27/10; C08L 67/02
[52] U.S. Cl. .................... 428/481; 428/480; 428/482; 428/528; 524/539; 525/443
[58] Field of Search ............... 525/443; 524/598, 539; 428/481, 482, 480

[56] References Cited

U.S. PATENT DOCUMENTS

| 2,681,894 | 6/1954 | Honel | 525/501.5 |
| 2,915,486 | 12/1959 | Shelley | 524/598 |
| 3,102,868 | 9/1963 | Bolton | 525/443 |
| 3,310,512 | 3/1967 | Curtice | 524/598 |
| 3,394,093 | 7/1968 | Salem | 523/206 |
| 3,549,577 | 12/1970 | Stromberg | 524/598 |
| 4,088,619 | 5/1978 | Holzrichter | 525/443 |

FOREIGN PATENT DOCUMENTS

| 180407 | 12/1954 | Austria . |
| 4053 | 9/1979 | European Pat. Off. . |
| 578934 | 8/1976 | Switzerland . |
| 1525419 | 9/1978 | United Kingdom . |

*Primary Examiner*—Theodore E. Pertilla
*Attorney, Agent, or Firm*—Connolly and Hutz

[57] ABSTRACT

Modified aminoplast resin comprising:
 (a) 60 to 99.5% by weight of an aminoplast precondensate which has been etherified with a lower alkanol to an extent not exceeding 10% and
 (b) 0.5 to 40% by weight of a modifying agent which comprises a mixture of (i) a water-soluble polyester prepared from carboxylic acids with at least one carboxyl and dihydric or polyhydric alcohols, and (ii) sufficient free diol or polyol whereby the mixture has a ratio of the sum of free and esterified hydroxyls of 0.8 to 4.5 moles for each mole of the sum of free and esterified carboxyls.

12 Claims, No Drawings

MODIFIED AMINOPLAST, ITS PREPARATION AND ITS USE

This is a continuation of copending application Ser. No. 371,070, filed Apr. 23, 1982, now abandoned.

The invention relates to a modified aminoplast which is suitable, in particular, for impregnating paper webs or fabric webs in the manufacture of coated wood-based materials or laminates. The invention also relates to a process for the manufacture of the modified aminoplast and to its use for the manufacture of coated wood-based materials or laminates.

Aminoplasts are resin-like products, and solutions thereof, which are formed by a condensation reaction between compounds containing amino or imino groups, the so-called aminoplast precursors and carbonyl compounds and, if appropriate, a lower alkanol.

Examples of known aminoplast precursors are melamine, urea, thiourea, dicyandamide, acetoguanamine and benzoguanamine.

Carbonyl compounds which are known to be suitable for the reaction with the aminoplast precursors are aliphatic or aromatic aldehydes and ketones, such as, for example, formaldehyde, acetaldehyde, propionaldehyde, butyraldehyde, isobutyraldehyde, benzaldehyde, acetone and methyl ethyl ketone.

Mixtures of different aminoplast precursors and different carbonyl compounds can also be employed for the preparation of aminoplasts.

Aminoplast precursors which are particularly advantageous and are therefore employed frequently are urea and melamine; a carbonyl compound which is employed particularly frequently is formaldehyde.

Lower alkanols which ca be present in the reaction between aminoplast precursors and the carbonyl compounds are those having 1 to 6 C atoms; the lower representatives of this group, ethanol and, in particular, methanol, are preferred for the preparation of so-called impregnating resins for the surface finishing of, for example, wood-based materials or laminated plastics.

The reaction between the aminoplast precursors, the carbonyl compounds and, if appropriate, the alkanol is only taken to such a point that the products still remain soluble and fusible. As soon as this condition has been reached, the condensation reaction is discontinued, for example by cooling and adjusting the pH of the reaction mixture to a slightly alkaline value. The incompletely condensed aminoplasts thus prepared (also called aminoplast precondensates) are used in the form of their aqueous solutions, in particular as impregnating resins, for the laminated plastic sheet industry and for the surface-finishing of wood-based materials.

In the surface finishing of wood-based materials of a decorative or protective layer is applied to wood fibre boards or wood particle boards by impregnating decorative paper webs or fabric webs with suitable aminoplasts, preferably melamine resins, and laminating these at a specific volatile content to the panels of the wood-based material by heat-curing. The pressure applied in this process can be about 10 to 100 bar (1 bar = $10^5$ Pa = 1 kg/cm$^2$) and the temperature can be about 120° to 180° C. During the compression moulding process the aminoplast cures completely and binds the paper web or fabric web to the panel of wood-based material. Laminates having a decorative or protective surface can be produced in a similar manner. In this case the decorative web impregnated with aminoplast resin is pressed by heat-curing onto several layers of craft paper which have been impregnated with a phenolic resin. The applied pressures here are within the range of approx. 50 to 150 bar, while the compression moulding temperatures, as in the case of the decorative coating of wood-based materials, are about 120° to 180° C. In order to increase the resistance to scratching and abrasion, a transparent, so-called overlay paper which has been impregnated with an aminoplast resin is applied to the decorative web before the compression moulding process. In some cases a barrier paper is also used between the decorative web and core and a backing paper is used on the reverse side. Melamine-formaldehyde resins are preferably used for impregnating the overlay web and the decorative web. Overlay papers and barrier papers can also be used in the surface finishing of wood-based materials.

The compression moulding can be effected by various methods. For example, it is customary to use multi-daylight presses in which the compression moulding is effected at 120° to 160° C. in the course of approx. 5 to 10 minutes and the press is cooled down to temperatures of 70° to 100° C. before the panels are taken out. This process makes it possible to produce surfaces of a very high degree of gloss even with the use of known resins. The disadvantageous factor is the long period of heating up and cooling down, which leads to long compression cycles and makes the process more expensive. In the so-called quick-cycling process, it is carried out between two platens only. The compression moulding here is effected at 120° to 160° C. in the course of only 30 to 120 seconds, and the product is taken out of the press without cooling the latter down. Although the compression moulding cycle here is short and cost-advantageous, it has hitherto not been possible, using known resins, to produce the same high degree of surface gloss as in the multi-daylight process using re-cooling.

A particularly serious disadvantage of the "quick-cycling process", which is otherwise very advantageous from the point of view of technical performance and cost efficiency, is that it does not enable very high degrees of gloss of the surfaces to be achieved if known impregnating resins are used. Hitherto, it has only been possible to achieve surfaces of such high gloss in multi-daylight presses with re-cooling.

A new production process is the continuous manufacture of so-called melamine continuous laminates on twin belt presses. In this process the decorative web is pressed onto a suitable carrier material, such as vulcanised fibre or so-called furniture parchments, between two steel belts under the application of pressure (10 to 30 bar) and temperature (130° to 170° C.).

When aminoplasts are processed in this way, the soluble and fusible aminoplast precondensates are transformed into infusible and insoluble products. Crosslinking takes place in this curing process. However, the rate of this crosslinking reaction is as a rule too low even at the elevated processing tempertures used for industrial purposes, and it must therefore be accelerated by adding so-called curing agents. In particular, it is only possible to carry out the quick-cycling process in the presence of effective curing agents in quantities of about 0.05 to 1%. Compounds having an acid reaction and/or liberating acid are used as curing agents. Examples of curing agents of this type are ammonium or amine salts, such as ammonium chloride, ammonium thiocyanate or ethanolamine hydrochloride, or strong organic acids, such as p-toluenesulphonic acid. If free acids or salts having a strongly acid reaction are used, relatively short pot lives for the aminoplast resin result, which has an adverse effect on processing.

Depending on the manner in which the curing process is carried out, the crosslinked aminoplasts form hard to very hard, glossy to highly glossy surfaces which are resistant to chemicals and heat. Coated wood-based materials and laminates are therefore distinguished by their good chemical and physical properties. However, the aminoplasts which are used for impregnating the paper webs or fabric webs intended for the decorative or protective layer, and which have not been rendered elastic, possess only a slight resilience in the cured state, as a result of which surfaces produced by means of these resins tend to form cracks.

When aminoplast resins are processed by the processes described above, however, it is not only the properties of the product which matter, but the aminoplast resin must have an adequate stability at room temperature even in the presence of a curing agent, but should cure as rapidly as possible at an elevated temperature. It should have a good tolerance against overcuring and should provide surfaces of high gloss even when the quick-cycling process mentioned above is used, it must not "give off dust" when processed, it must not adhere to the press plates and it must not deposit incrustations on the press plates.

Good aminoplast resin should, as far as possible, have a combination of all the properties mentioned and should lead to processing results of high quality. The requirements set for aminoplasts are, therefore, exceedingly varied and cannot be met by unmodified resins. Thus, for example, there has been no lack of attempts to eliminate or to reduce the inadequate resilience of the aminoplast decorative layer by modification, that is to say by adding substances to the impregnating resins. In particular, polyalcohols, sorbitol and sugar and also aromatic sulphonamides have been recommended as additives. If polyalcohols or sugars are added, however, the resistance to water of the cured resins becomes insufficient, even if the resilience should be adequate. Sulphonamides on their own are not adequate for achieving good resilience.

If caprolactam is added as a modifying agent in order to increase the resilience of the finished surfaces, it is possible to add reltively large quantities of curing agents to the impregnating resins and, in so doing, nevertheless to achieve an adequately long pot life before use. Unsatisfactory features are, however, the reserve of resilience, which is not very good, the reduced resistance to water and non-uniform gloss of the surface produced therewith.

It is known (German Offenlegungsschrift No. 2,149,970) that crack formation in the surface of wood-based materials and laminated plastics can be eliminated, that is to say their resilience can be increased, if the paper webs or fabric webs intended for the decorative or protective layer are impregnated with an aminoplast resin which has been modified with methylene-bis-formamide and are then laminated in a manner which is in itself known onto panels of wood-based materials or processed to give a laminated plastic. The formation of more uniform gloss on the finished surfaces is also effected if aminoplast resins which have been modified with methylenebisformamide are used as so-called quick-cycling resins, that is to say impregnating resins which are suitable for the addition of large quantities of curing agents or additives which accelerate curing and are thus suitable for particularly rapid curing or processing. However, it has been found in practice that if aminoplast resins which have been modified with methylenebisformamide are stored for a prolonged period, their technical performance advantages, particularly resistance to cracking, are in part lost again.

In the field of aqueous lacquers for the production of protective lacquer films, in particular on metal components, such as automobile bodies and the like, by means of the so-called electrocoating process, aqueous systems are known (compare, for example, "Lacke und Lösemittel" ("Lacquers and Solvents") (1979), Verlag Chemie, Weinheim, New York, pages 35 and 36, righthand column; A, Bachmann and T. Bertz, "Aminoplaste" ("Aminoplasts"), VEB Deutscher Verlag für Grundstoffindustrie; U.S. Pat. No. 3,102,868 and a corresponding reference in German Offenlegungsschrift No. 2,627,926) which consists mainly of water-soluble polyesters and contain an admixture of aminoplast resins as the crosslinking agent. Coatings produced from these lacquers are cured by radiant heat and are not suitable for curing in heated presses and are thus not suitable for the production of coated wood-based materials or laminated plastics.

The present invention relates, therefore, to a modified aminoplast which fulfils, to a large extent, the above-mentioned requirements set for impregnating resins for the production of wood-based materials and laminated plastics having a decorative coating, and which thus has a combination of technically valuable properties which confers upon it considerable advantages, compared with aminoplasts hitherto known. In particular, it is possible, using the aminoplast according to the invention, to produce, in the surface finishing of wood-based materials, even using the quick-cycling process, crack-resistant, hard surfaces having excellent gloss properties such as it has hitherto only been possible to achieve in multi-daylight presses with re-cooling.

The aminoplast modified in accordance with the invention consists of 60 to 99.5% by weight of an aminoplast which is not more than 10% etherified, 0 to 20% of known modifying agents and 0.5 to 40% by weight of a modifying agent consisting of a mixture of a water-soluble polyester prepared from saturated aliphatic or cycloaliphatic and/or aromatic monocarboxylic, dicarboxylic or polycarboxylic acids and dihydric or polyhydric alcohols and, if appropriate, free diols or polyols in such a ratio that, relative to 1 mol of optionally esterified carboxyl groups, up to 4.5 mols of optionally esterified alcoholic —OH groups are present in the mixture, the polyester present in the modifying agent having an acid number of 30 to 150, preferably 60 to 120. Preferred aminoplasts modified in accordance with the invention are those which contain 2.5 to 15% by weight of the modifying agent to be employed in accordance with the invention.

The aminoplast modified in accordance with the invention is thus composed of an unmodified aminoplast precondensate or an aminoplast precondensate which has been pre-modified in a conventional manner by means of known modifying agents, which will hereinafter be designated the base resin, and of the modifying agent to be employed in accordance with the invention. It contains at least 60% by weight of aminoplast precondensate, and the sum of the modifying agents is 40% by weight, relative to the total quantity of aminoplast precondensate and modifying agents. Suitable base resins are, in principle, any known aminoplast precondensates, provided that they can be used as impregnating resins. Fundamentally, any water-soluble aminoplast precondensates can be used, if an aqueous solution of them does not have too high a viscosity and if they can be cured by heat. As already described above, aminoplast resins of this type are condensation products which are formed from known aminoplast precursors and carbonyl components, as a rule formaldehyde, and which, if the condensation reaction has been carried out in the presence of alkanols, preferably methanol, can, in addition, also be etherified incipiently to the extent of up to 10%, but are preferably unetherified, and which have, at the most, been precondensed to such a point that they still possess an adequate solubility in water and pass through a melting phase before they are finally completely condensed by heat. Aminoplast resins fulfilling these conditions are known in large numbers and are employed in a wide range as impregnating resins. Base resins which are particularly advantageous for the aminoplasts modified according to the invention are those having an aminoplast:formaldehyde molar ratio of 1:1.3 to 1:3, preferably 1:1.5 to 1:2.5. The aminoplast precursors on which the preferred base resins are based are, as a rule, melamine, urea and benzoguanamine, in particular melamine and urea or combinations of melamine and urea. The preferred base resins are thus melamine-formaldehyde and/or urea-formaldehyde and/or benzoguanamine-formaldehyde precondensates, in particular melamine-formaldehyde and/or urea-formaldehyde precondensates.

Pure melamine-formaldehyde precondensates, that is to say those based exclusively on melamine as the aminoplast precursor are preferred as the base resins for particularly high-grade resins according to the invention. The base resins can also be premodified, suitable pre-modifying agents being known compounds such as alkanols having 1 to 4, preferably 1 to 2, C atoms, in particular methanol, ethylene glycol, ethylene diglycol, pentaerythritol, sugars, sorbitol, carbamates, such as, for example, methyl carbamate or methoxyethyl carbamate, sulphamic acid and salts thereof, aromatic sulphonamides, caprolactam and/or methylene-bis-formamide.

Base resins which can be recommended particularly are those which are etherified only very slightly or not at all. Base resins which are very advantageous are also those which contain, relative to solids content, 0.2 to 1.0% by weight of an amine of the formula I

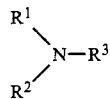 (I)

wherein $R^1$ and $R^2$ denote identical or different alkyl radicals having 1 to 4 C atoms, preferably methyl, and $R^3$ denotes 2-(2-hydroxyethoxy)-ethyl, 3-hydroxy-prop-1-yl, 3-hydroxy-prop-2-yl, preferably 2-hydroxyethyl or 2,3-dihydroxypropyl, or a radical of the formula

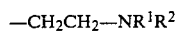

The amine can already be present during the condensation reaction or it can be added subsequently to the precondensate. Accordingly, it can be present wholly or partially in the form of its reaction products with the melamine-formaldehyde condensation product. The amine, or a partial quantity of the amine, can, of course, also be introduced into the aminoplast resin modified in accordance with the invention conjointly with the polyester which has been added as a modifying agent. When preparing the base resins, the condensation reaction is as usual taken only to such a point that the resins still remain soluble and fusible. In this reaction, condensation is as a rule carried on until there is a limited dilutability with water. The base resins employed for the preparation of the aminoplasts according to the invention are as a rule subjected to condensation until a dilutability with water of 1:0.7 to 1:4, preferably 1:1.0 to 1:2.5, is reached.

In some cases, for example if major quantities of salts of sulphamic acid are added, the resins obtained can also be soluble in water in all proportions. The dilutability with water is determined by titrating a sample of the resin with water at 20° C. For example, the description "dilutability with water 1:X" means that 1 ml of resin can take up X ml of water at 20° C., without the formation of cloudiness. Information on carrying out the condensation reaction in the preparation of aminoplasts is contained, for example, in Kirk-Othmer, Encyclopedia of Chemical Technology, 1st edition, volume 1 (1947), 756–759; Houben-Weyl "Methoden der organischen Chemie" ("Methods of Organic Chemistry"), volume XIV/2 "Macromolecular Substances" part 2 (1963), Georg Thieme Verlag Stuttgart, in particular pages 346 to 357 (urea condensation products), pages 357–371 (melamine condensation products) and pages 382–388 (condensation products of dicyandiamides and guanidine); John F. Blais "Amino Resins", Reinhold Publishing Corp., New York (1959), pages 26–53; C. P. Vale "Aminoplastics", Cleaver Hume Press Ltd., London (1950), pages 12–87; and Ullmanns Enzyclopädie der technischen Chemie ("Ullmann's Encyclopedia of Industrial Chemistry"), 4th edition, volume 7 (1973), pages 403 to 414.

The aminoplast resins modified in accordance with the invention can be prepared by adding the modifying agent to be employed in accordance with the invention to the base resin mixture before or during the condensation reaction, as is also done when using other known modifying agents. However, it has proved particularly appropriate and advantageous to mix the modifying agent to be employed in accordance with the invention into the base resin, afteer the preparation of the latter, in the quantity, between 0.5 and 40% by weight, relative to solids content, which is optimum for the particular end use.

The modifying agent according to the invention which is present in the aminoplasts modified in accordance with the invention consists of a water-soluble polyester or a mixture of a water-soluble polyester with the diols and polyols employed in its preparation. Up to 50% by weight of free diols or polyols can be present in such mixtures. However, such mixtures preferably contain only up to 10% by weight of diols and polyols. The acids numbers of such mixtures are reduced, compared with the acid number of the pure polyesters, because of the diol and/or polyol content and are indeed reduced in accordance with the proportion of the polyester in the mixture. Thus, for example, for a mixture containing X % of a polyester having an acid number n, the acid number m of the mixture becomes m=X·(n/100). The lower limit of the acid number is therefore displaced to 15, preferably 30, corresponding to a minimum polyester content in the mixture of 50% by weight, for mixtures which are present as modifying agents in aminoplasts modified in accordance with the invention.

Water-soluble polyesters having acid numbers between 30 and 150 are already known and have been described in many variants in respect of the monomeric constituents which have been co-condensed therein. In principle, it is possible to employ, as modifying agents in the aminoplast resins according to the invention, any known water-soluble polyesters which have an acid number within the range indicated and which, if customary starting components have been subjected to condensation, then have a molecular weight of 300 to 1500.

It is particularly preferable to use pure polyesters or those having only a low content, below 2% by weight, of free diols or polyols.

Preferred modifying agents are polyesters and mixtures thereof with diols and/or polyols which have been synthesised from radicals of the following formulae:

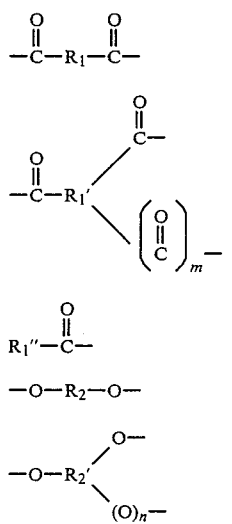

$$-\underset{\|}{\overset{O}{C}}-R_1-\underset{\|}{\overset{O}{C}}- \quad (A)$$

$$(A_1)$$

$$(A_2)$$
$$R_1''-\underset{\|}{\overset{O}{C}}-$$

$$-O-R_2-O- \quad (B)$$

$$(B_1)$$

wherein $R_1$ denotes a divalent, saturated aliphatic or cycloaliphatic or aromatic radical, m denotes the number 1 or 2, preferably 1, $R_1'$ denotes a saturated aliphatic or cycloaliphatic or aromatic radical which is trivalent if $m=1$ and is tetravalent if $m=2$, $R_1''$ denotes a monovalent, saturated aliphatic or cycloaliphatic or aromatic radical, $R_2$ denotes a divalent radical which is composed, as a statistical average, of 40 to 100 mol % of the radicals $-CH_2-CH_2-O-CH_2-CH_2-$ and/or $-CH_2-CH_2-O-CH_2-CH_2-O-CH_2CH_2-$, 0 to 50 mol % of aliphatic, cycloaliphatic or araliphatic radicals and, is special cases, 0 to 20 mol % of radicals of the formula $-CH_2-CH_2-(O-C_2H_4)_p-$ having an average molecular weight of 300 to 2000, n denotes a number from 1 to 6, preferably 1 or 2, and $R_2'$ denotes a saturated aliphatic or cycloaliphatic radical which is trivalent if $n=1$, is tetravalent if $n=2$ and is pentavalent if $n=3$.

In the polyesters to be employed in accordance with the invention as modifying agents the radicals $R_1$, $R_1'$, $R_1''$, $R_2$ and $R_2'$ are not limited to a single meaning in each case, but can have several meanings within the scope of their definition.

The structural groups (A) present in the polyesters are derived from co-condensed dicarboxylic acids, the structural groups ($A_1$) are derived from co-condensed tricarboxylic or polycarboxylic acids and the structural units ($A_2$) are derived from co-condensed monocarboxylic acids. Co-condensed monocarboxylic acids are of course always terminal groups and can be used to impart particular properties, such as increased resilience and resistance to water, to the cured aminoplast resins according to the invention. Tricarboxylic or polycarboxylic acids produce free carboxyl groups in the middle of the polyester chain or lead to branching in the polyester chain.

Structural groups of the formula (B) are derived from co-condensed diols, while structural groups of the formula ($B_1$) are derived from co-condensed triols or polyols. Structural groups of the formula ($B_1$) produce free hydroxyl groups in the middle of the polyester chain or also lead to branching in the polyester molecule.

As a rule, the polyesters contain, relative to 100 mol % of the radicals $(A+A_1+A_2)$, 80 to 180, preferably 90 to 120, mol % of radicals $(B+B_1)$ and contain, relative to 100 mol % of the dicarboxylic and polycarboxylic acids used for the preparation of the polyester, 15 to 60, preferably 25 to 50 and particularly 30–40, mol % of $-COOM$ groups wherein M is hydrogen or an alkali metal cation.

The relationship between acid numbers and the proportion of carboxyl groups in the polyester is known and also depends on the molecular weights or equivalent weights of the polyester structural units. It can be taken as a rule of thumb for the polyesters to be employed in accordance with the invention, that an acid number of 30 corresponds to about 16 mol % of $-COOM$ groups, an acid number of 150 corresponds to about 60 mol % of $-COOM$ groups, the range of acid numbers from 60 to 120 corresponds to a range of $-COOM$ groups from 25 to 50 mol % and acid numbers of about 90 correspond to approx. 35 to 40 mol % of $-COOM$ groups.

These characteristics can be imparted readily in a known manner by choosing the desired ratio of acid and alcohol components and/or by monitoring the progress of the esterification reaction and discontinuing it when the desired acid number has been reached.

It is, of course, possible to employ as modifying agents, in accordance with the invention, polyesters which are free from structural groups of the formulae ($A_1$) and ($A_2$). With regard to the more uniform distribution of the carboxyl groups in the polyester chain, the polyesters present in the aminoplasts modified in accordance with the invention contain, relative to 100 mol % of the radicals $(A+A_1+A_2)$ originating from the acid components, normally up to 40 and preferably 20 to 30, mol % of radicals ($A_1$) having a valency greater than 2 and, relative to 100 mol % of the radicals $(A+A_1+A_2)$, contain not more than 10 mol % of monovalent radicals ($A_2$) originating from monocarboxylic acids.

It is also possible to employ, in accordance with the invention, polyesters containing no structural groups of the formula ($B_1$). If, however, such branching units are desired, the polyesters as a rule contain, relative to 100 mol % of the radicals $(B+B_1)$ originating from alcohol components, up to 50, preferably 20 to 35, mol % of radicals ($B_1$) having a valency greater than 2.

The composition of the components $(A+A_1+A_2)$ can be defined in a manner which is in itself known by choosing the acid components according to type and quantity, while composition of the components $(B+B_1)$ can be defined by choosing the alcohol components. It is particularly advantageous if the polyester present in the modifying agent contains, relative to 100 mol % of the radicals (A+A$_1$+A$_2$), at least 40 mol % of radicals of the formula

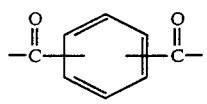

It is also advantageous if acid radicals (A$_1$) having a valency greater than 2 are those of the formula

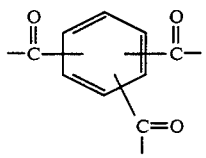

such as are introduced, for example, by using trimellitic acid in the preparation of the polyester.

It is very advantageous if, in the radicals (B+B$_1$), 40 to 100 mol %, preferably 60 to 100 mol %, of radicals of the formulae —O—CH$_2$—CH$_2$—O—CH$_2$CH$_2$—O— and/or —O—CH$_2$—CH$_2$—O—CH$_2$CH$_2$—O—CH$_2$CH$_2$—O— are present.

A proportion of up to 20 mol %, preferably 5 to 10 mol %, of the radicals (A) and (B) can be replaced by an equivalent proportion of radicals of the formula

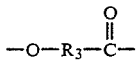

wherein R$_3$ is a divalent, saturated aliphatic, cycloaliphatic or araliphatic radical.

Polyesters according to the invention which are preferred are those in which saturated, divalent aliphatic radicals represented by R$_2$ contain 2 to 10 carbon atoms, divalent, saturated cycloaliphatic radicals contain 6 to 10 carbon atoms and divalent, araliphatic radicals contain 8 to 14 carbon atoms, those in which divalent, saturated aliphatic radicals represented by R$_1$ contain 2 to 8 carbon atoms, divalent, saturated cycloaliphatic radicals contain 6 to 8 carbon atoms and divalent aromatic radicals contain 6 to 12 carbon atoms, and also those in which any divalent, saturated aliphatic radicals represented by R$_3$ which may be present contain 1 to 10 carbon atoms, divalent cycloaliphatic radicals contain 6 to 11 carbon atoms and divalent araliphatic radicals contain 8 to 12 carbon atoms. Aliphatic and, in particular, aromatic radicals are preferred for R$_1$ and R$_1'$, while cycloaliphatic and, in particular, aliphatic radicals, as well as the oxygen-containing radicals in the chain, are preferred for R$_2$.

The preparation of the copolyesters according to the invention can be effected in a manner which is in itself known by subjecting dicarboxylic acids of the formula

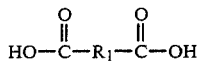

to a condensation reaction with diols of the formula

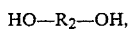

and it is also possible for a component having a basicity greater than two

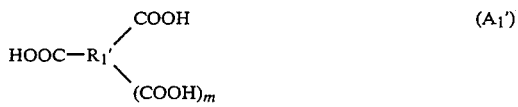

and a monobasic acid

HOOC—R$_1''$      (A$_2'$)

and/or a triol or polyol

to be present during the condensation reaction. In these formulae the symbols R$_1$, R$_2$, R$_1'$, R$_1''$, R$_2'$, n and m have the meanings indicated above.

Normally, not merely one single starting substance from each of the groups (A'), (A$_1'$), (A$_2'$), (B') and (B$_1'$), but, within the scope of the definition indicated, at least mixtures of several substances belonging to the groups (A') and (B') will be employed in the preparation of the polyesters.

The ratio of dicarboxylic and polycarboxylic acids (A') and (A$_1'$) to the diol or polyol components (B') and (B$_1'$) can be varied between 100 mol %: 80 mol % and 100 mol %: 450 mol %. If there is an excess of diol component, mixtures of polyesters and diols and polyols participating in the synthesis thereof will be obtained which are immediately suitable as modifying agents. Preferably, the quantity of dicarboxylic and polycarboxylic acid employed is such, and the condensation reaction is taken to such a point, that, relative to the total quantity of the carboxylic acids (A'+A$_1'$+A$_2'$), 15 to 60 mol %, preferably 25 to 50 mol %, of —COOM groups are present in the resulting polyester. If it is desired to prepare polyesters having a proportion of structural units (A$_1$) and/or (B$_1$) of higher valency, a proportion of tricarboxylic and polycarboxylic acids (A$_1'$) of up to 40 mol %, preferably 20 to 30 mol %, and a proportion of triols and polyols (B$_1'$) of up to 50 mol %, preferably 20 to 35 mol %, will be employed.

Preferred copolyesters to be employed in accordance with the invention are prepared by employing diol components or diol mixtures (B') in which R$_2$ is composed, as a statistical average, of 40 to 100 mol %, in particular 60 to 100 mol %, of the radicals —CH$_2$—CH$_2$—O—CH$_2$—CH$_2$— and/or —CH$_2$—CH$_2$—O—CH$_2$CH$_2$—O—CH$_2$CH$_2$—, 0 to 50 mol % of aliphatic, cycloaliphatic or araliphatic radicals and, in special cases, 0 to 20 mol %, in particular 0 to 10 mol %, of radicals of the formula —CH$_2$—CH$_2$—(O—C$_2$H$_4$)$_p$— having an average molecular weight of 300 to 2000.

Instead of the carboxylic acids, it is also possible to employ anhydrides or acid halides thereof. Up to 50 mol % of these acid components can also be replaced by the corresponding esters, in particular esters with readily volatile lower alcohols having 1 to 4 carbon atoms. When preparing the polyesters, a proportion of up to 20 mol %, preferably 5 to 10 mol %, of the components (A'+B') can be replaced by an equivalent part of one or more hydroxycarboxylic acids of the formula

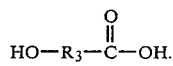
(C')

The condensation reaction is carried out in the usual manner at an elevated temperature of 100° to 280° C., in particular 150° to 230° C., preferably under an atmosphere of an inert gas, such as, nitrogen or carbon dioxide, the volatile condensation products (water and/or alcohols), and, if they are not desired in the end product, excess diol components, being removed by distillation. It can be appropriate to apply a vacuum of, for example, 10 to 20 mbar or, if necessary, lower (0.5 mbar) towards the end of the condensation reaction, in order to remove the volatile products to a substantial extent.

In the polycondensation reaction, all the components used can be subjected to the polycondensation reaction from the start, that is to say they can be taken initially. They can, however, also be added in any desired sequence at different times, so that the constituents first added can already form precondensates. Components which cause branching, in particular, are appropriately not added until later.

The polycondensation reaction can also be carried out in one or more stages, it being possible, for example, to carry out the subsequent acidification by means of a dicarboxylic or tricarboxylic acid anhydride to give the poly-half-ester as a separate stage. The reaction is followed by determining the acid number. Water-soluble polyester resins which are compatible with the aminoplast resin and which, in combination with the aminoplast resin, have an adequate stability on storage, are obtained, in particular, if the esterification is discontinued at acid numbers between 40 and 150, preferably 60 and 120.

The polycondensation reaction normally takes 3 to 15 hours and is carried to such a point that the desired molecular weight is achieved. Care must always be taken to ensure that crosslinking of the copolyester does not occur as the result of carrying the condensation reaction too far, since otherwise the products will become water-insoluble and unsuitable for the purpose according to the invention.

The polycondensation reaction can be carried out either using the customary esterification or transesterification catalysts, such as acids, such as hydrochloric acid, sulphuric acid, phosphoric and phosphorous acid, in particular toluenesulphonic acid, alkali metal alcoholates, titanium alcoholates, manganese acetate, zinc acetate and the like, or entirely without such catalysts.

The polyester resin is finally adjusted to pH values between 6 and 8, preferably by means of a tertiary amine, and, if appropriate, is diluted with water or a water-miscible solvent. Suitable tertiary amines are those containing, in addition to alkyl groups having 1 to 4 C atoms, 0 to 3 hydroxyalkyl groups having 2 to 3 C atoms.

In addition to trimethylamine, triethylamine, tripropylamine and tributylamine, amines which may be mentioned are dimethylethanolamine, diethylethanolamine, methyldiethanolamine, ethyldiethanolamine, tris-(2'-hydroxypropyl)-amine, tris-(3'-hydroxypropyl)-amine and triethanolamine; dimethylethanolamine is particularly suitable.

The polyesters which are to be employed as modifying agents and have been prepared in accordance with the above instructions have average molecular weights between 300 and 1500, preferably between 700 and 1200.

The following may be mentioned as examples of saturated aliphatic, cycloaliphatic and aromatic dicarboxylic acids which are suitable for the preparation of polyesters to be employed in accordance with the invention: succinic acid, methylmalonic acid, glutaric acid, dimethylmalonic acid, adipic acid, pimelic acid, suberic acid, 2,2-dimethylglutaric acid, azelaic acid, trimethyladipic acid, sebacic acid, 1,2-cyclohexanedicarboxylic acid, 1,3-cyclohexanedicarboxylic acid, 1,4-cyclohexanedicarboxylic acid, tetrahydrophthalic acid, endomethylenetetrahydrophthalic acid, norbornanedicarboxylic acid, phthalic acid, isophthalic acid, terephthalic acid, 1,4-naphthalenedicarboxylic acid, 2,5-naphthalenedicarboxylic acid and diphenic acid. The carbon skeleton of the dicarboxylic acids under consideration can also be interrupted by hetero-atoms, such as oxygen or sulphur, or hetero-groups, such as $-SO_2-$. Examples of this are diglycollic acid, thiodipropionic acid, 4,4'-oxydibenzoic acid or 4,4'-sulphonyldibenzoic acid. Phthalic acid, isophthalic acid, terephthalic acid, succinic acid, glutaric acid, sebacic acid or cyclohexanedicarboxylic acid are preferred.

As already mentioned, the said dicarboxylic acids can also be employed in the form of their esters, anhydrides or acid halides. Suitable esters are those with monoalcohols which can be removed readily by distillation, that is to say, preferably, those having 1 to 4 carbon atoms, but esters with diols or polyols are also suitable.

The following are examples of suitable diols (B') which supply the radical (B): ethylene glycol, propane-1,2-diol, propane-1,3-diol, butanediol, in particular butane-1,4-diol, pentanediols, such as pentane-1,5-diol, hexanediols, in particular hexane-1,6-diol, decane-1,10-diol, diethylene glycol ($HOCH_2CH_2-O-CH_2CH_2OH$), dipropylene glycol, triethylene glycol ($HOCH_2CH_2CH_2-O-CH_2CH_2-O-CH_2CH_2OH$), tetraethylene glycol, tripropylene glycol, polyethylene glycol or molecular weight 300–2000, bis-(4-hydroxybutyl) ether, 2-methylenepropane-1,3-diol, 2,4-dimethyl-2-ethylhexane-1,3-diol, 2-ethyl-2-butylpropane-1,3-diol, 2,2-dimethylpropane-1,3-diol, 2-ethyl-2-isobutylpropane-1,3-diol, 2,2,4-trimethylhexane-1,6-diol, 1,3-dihydroxycyclohexane, 1,4-dihydroxycyclohexane (quinitol), 1,4-bis-(hydroxymethyl)-cyclohexane, 1,3-bis(hydroxymethyl)-cyclohexane, 1,2-bis-(hydroxymethyl)-cyclohexane, 1,4-bis-(hydroxymethyl)-benzene, 1,3-bis-(hydroxymethyl)-benzene and 2,6-bis-(hydroxymethyl)-naphthalene.

Preferred diol components are glycols, such as ethylene glycol, propylene glycol, butanediols, neopentylglycols, hexanediols and, in particular, ether-alcohols, such as diethylene and triethylene glycol.

The following are examples of suitable hydroxycarboxylic acids (C') which supply the radical (C): glycollic acid, lactic acid, 3-hydroxypropionic acid, 4-hydroxybutyric acid, 5-hydroxypent-3-anoic acid, mandelic acid, 3-hydroxymethylcyclohexanecarboxylic acid, 4-hydroxymethylcyclohexanecarboxylic acid, 6-hydroxymethyldecalin-2-carboxylic acid,

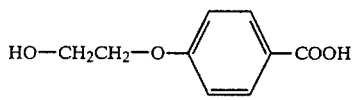

and

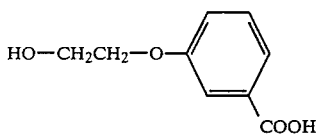

The following are examples of suitable compounds (A₁') which introduce the group (A₁) into the copolyester molecule: trimellitic acid, trimesic acid, hemimellitic acid, mellophanic acid, prehnitic acid, pyromellitic acid, aconitic acid, tricarballylic acid, citric acid, malic acid, tartaric acid, ethanetetracarboxylic acid, 1,2,3-cyclohexanetricarboxylic acid, 1,2,4-cyclohexanetricarboxylic acid, 1,3,5-cyclohexanetricarboxylic acid, naphthalenetricarboxylic acid, and benzophenonetetracarboxylic acid and also anhydrides and esters thereof, in particular methyl esters. Preferred carboxylic acids of this group are trimellitic acid and pyromellitic acid and their derivatives.

The following are examples of suitable compounds (B₁'): glycerol, hexanetriol, erythritol, pentaerythritol, dipentaerythritol, trimethylolethane, trimethylolpropane, trimethylolhexane and dimethylolcyclohexane, pentaerythritol, trimethylolethane and trimethylolpropane being preferred.

The following are examples of monocarboxylic acids (A₂') which are suitable for co-condensation into polyesters to be employed in accordance with the invention: formic acid, acetic acid and propionic acid.

The production of panels of wood-based material having a decorative coating using the aminoplasts according to the invention is effected in a manner which is in itself known by impregnating the paper web or fabric web with an aminoplast according to the invention and processing the material further in a manner which is in itself known. The impregnated and dried paper web or fabric web is therefore pressed onto the previously prepared panel of wood-based material under pressures of approx. 10 to 100 bar at temperatures of approx. 120° to 180° C.

Laminates can be prepared analogously instead of panels of wood-based materials if carrier webs impregnated with a phenolic resin are used, in which case applied pressures of approx. 50 to 150 bar and temperatures of approx. 120° to 180° C. are employed. Information on the production of coated panels of wood-based material and laminates is to be found in J. F. Blais loc. cit., pages 122–138; C. P. Vale, loc. cit., pages 209–214 and Ullmann, loc. cit., pages 417–418.

The laminates, and preferably coated wood-based materials, which are produced using aminoplasts according to the invention exhibit, even when produced by the quick-cycling process, a very high and uniform gloss, satisfactory curing and high resilience and also meet the other requirements which are set for a satisfactory surface. The aminoplasts according to the invention are stable on storage, that is to say the excellent results obtained on processing the aminoplasts are achieved during the whole life period of the resin.

The aminoplasts according to the invention are particularly suitable as quick-cycling resins and, in addition, are also largely insensitive to overcuring, such as can occur in practice, for example as a result of extended mould dwell times, increased compression moulding temperatures and/or an increased quantity of curing agent, and they liberate only small quantities of formaldehyde when processed.

The high surface resilience achieved in the laminates and coated wood-based materials which have been produced using the aminoplasts according to the invention is, for example, responsible for the fact that no cracks are formed when the tendency of these products to cracking is tested as specified in DIN 53,799 dated May 1975, item 4.7.1 (laminates), or 4.7.3 (coated wood-based materials), the samples being stored for 20 hours at 80° C. (This determination of susceptibility to cracking is described below as heat treatment or heat treatment test. Even when the temperature is raised to 100° C., cracks are still not formed in most cases.

Unless otherwise specified, percentages quoted in the examples are percentages by weight; temperature data are given in °C.

EXAMPLE 1

(a) 3250 g of 39% strength by weight aqueous formaldehyde, 300 g of methanol, 250 g of water and 200 g of a 40% strength by weight aqueous solution of sodium sulphamate, 5 g of dimethylethanolamine and 3100 g of melamine are heated to 90° C. in the course of 30 to 40 minutes in a 10 l stirred flask and are subjected to a condensation reaction at this temperature until a dilutability with water of 1:2.2 is reached (duration approx. 4 hours). The pH value of the solution should be 10.0±0.2.

(b) 1350 g of triglycol (9 mols), 1224 g of pentaerythritol (8.8 mols) and 2664 g of phthalic anhydride (18 mols) are heated to 180° C. in a 5 l four-necked flask with ground joints equipped with a stirrer, a thermometer, a gas inlet tube for nitrogen and a descending condenser, in the course of approx. 1 hour while passing a gentle stream of nitrogen through the mixture. The temperature is then gradually raised to 200° C. in the course of 5 hours, while stirring continuously, until an acid number of 70 has been reached, in the course of which approx. 150 ml of distillate pass over. After cooling to 90° C., the contents of the flask are diluted with 1800 g of water and neutralised with 550 g of dimethylethanolamine, 7.4 kg of a 75% strength aqueous polyester resin having a pH value of 6.6 (determined in a mixture of 1 part of 75% strength polyester resin and 1 part of 50% strength aqueous ethanol) being obtained.

(c) After cooling to 30° C., 10%, calculated on the basis of solid base resin, of the water-soluble polyester resin prepared in accordance with section (b) are added as a modifying agent to the "base resin" prepared in section (a) of this example, and water is added to adjust the solids content to 56% by weight.

1.1. 0.9% by weight, relative to solid resin, of morpholine para-toluenesulphonate was added to this resin solution as a curing agent (this curing agent is also used in the following examples). A white 80 g/cm² decorative paper was impregnated in the impregnating liquor to which the curing agent had been added, to a final weight of approx. 190 g/m² and was dried to a volatile content of 5.5 to 6.5% by weight (5 minutes/160° C.). (The statement 5 minutes/160° C. indicates that the volatile content was determined by storing a sample for 5 minutes at 160° C. and that the volatile content was calculated from the loss in weight caused thereby).

1.1.1. Part of the paper was then pressed onto wood particle board on a quick-cycling press under a pressure of 18 to 22 bar at a temperature of 160° C. The mould dwell time of the press was 60 seconds. After being released hot from the mould, the surfaces of the coatings had an excellent high gloss. In addition to good curing, no cracks were produced after heat treatment for 20 hours at 140° C. in a heating cabinet equipped with air circulation, which clearly shows the excellent reserve of resilience of the impregnating resin according to the invention.

1.1.2. Part of the impregnated paper was pressed onto wood particle board on a quick-cycling press under a pressure of 18 to 22 bar at a temperature of 180° C. and a mould dwell time of 2 minutes (compression moulding with overcuring). The surfaces of the coatings had a uniform high gloss and a very high degree of curing and exhibited no cracks.

1.1.3. Part of the impregnated paper was pressed onto wood particle board on a multi-daylight press under a pressure of 18 to 22 bar at a temperature of 140° C. The mould dwell time of the press was 10 minutes. The press was then cooled down to a temperature of 70° to 80° C. and the material was released from the mould. The surfaces of the coated wood particle board were very well cured and exhibited a uniform high gloss and no cracks after heat treatment for 20 hours at 80° C.

1.2. 1.2% by weight, relative to solid resin, of curing agent was added to the resin solution of Example 1. An 80 g/m² paper was impregnated as in Example 1.1 in the impregnating liquor to which curing agent had been added, and was dried. The impregnated paper was compression-moulded in accordance with Example 1.1.2. The surfaces of the paper had a uniformly high gloss and were very well cured and exhibited no cracks.

1.3. Without adding curing agent, the resin solution of Example 1 was stored for 21 days at room temperature (20° to 25° C.) and 0.8% by weight, relative to solid resin, of curing agent was then added. A white 80 g/m² paper was impregnated in this solution in accordance with Example 1.1 and was compression-moulded as in Example 1.1.2. The surfaces of the coatings had a very good high gloss and were very well cured and remained free from cracks.

1.4. Comparison Example

5% by weight, relative to solid resin, of methylenebisformamide are mixed, in accordance with German Offenlegungsschrift No. 2,149,970, into the base resin prepared in Example 1a), and the procedure followed is otherwise as in Example 1. 0.9% by weight, relative to solid resin, of curing agent was added to the resulting resin solution. An 80 g paper was impregnated in this impregnating liquor in accordance with Example 1.1. and was dried and compression-moulded in accordance with Example 1.1.2. The surfaces of the coatings were very well cured and exhibited no cracks and a uniform gloss which, however, was markedly inferior to the degree of gloss of the surfaces produced in accordance with Example 1.1.2. Without adding curing agent, the resin solution was stored for 14 days at room temperature and subjected to processing as above. The surfaces of the coatings exhibited individual cracks over the entire surface.

1.5 Comparison Example

The preparation of the resin solution in accordance with Example 1 was repeated, with the exception that the modifying product according to the invention was omitted. Wood particle board was coated as in Example 1.1.2., using the amino resin solution thus prepared. The surfaces of the coated particle board exhibit crack formation over the entire area and marked imperfections of gloss.

EXAMPLE 2

(a) A base resin was prepared in accordance with the instructions in Example 1a).

(b) 1908 g of diglycol, 1705 g of phthalic anhydride and 830 g of trimellitic anhydride in a 5 l flask, equipped as in Example 1b), are heated to 180° C. while passing a gentle stream of nitrogen through the mixture and are stirred for approx. 5 hours at this temperature until an acid number of 90 has been reached, in the course of which approx. 210 ml of distillate pass over. After cooling to 90° C., 540 g of water and 590 g of dimethylethanolamine are added to the contents of the flask, whereupon 5.3 kg of a 75% strength aqueous polyester resin having a pH value of 6.6 (determined in a mixture of 1 part of 75% strength polyester resin and 1 part of 50% strength aqueous ethanol) are obtained.

(c) 8% (this being calculated on solid base resin) of the modifying agent according to section b) are mixed into the base resin according to section a). All of the other reaction conditions are kept constant.

2.1 0.9% of curing agent was added to the resin solution thus prepared and further processing was carried out as described under Example 1.1.2. The surfaces of the particle board thus coated exhibited a satisfactory high gloss and remained free from cracks within a volatile range of 6 to 7% by weight.

2.2. 0.4% of curing agent was added to the resin solution and further processing was carried out in accordance with Example 1.1.3. The wood particle board with a decorative coating produced in this way also had a very good high gloss and was well cured and exhibited no cracks after heat treatment for 20 hours at 80° C.

EXAMPLE 3

145 g of the modifying agent described in Example 1b) (approx. 5% by weight being present, calculated on solid matter) and 70 g of diethylene glycol are mixed into the base resin according to Example 1a). All the other conditions of Example 1 remain constant.

0.4% relative to solid resin, of curing agent was added to this resin solution and further processing was carried out in accordance with Example 1.1.3. The surfaces of the wood particle board thus coated are well cured and exhibit an excellent high gloss and remain free from cracks even after heat treatment for 20 hours at 80° C.

EXAMPLE 4

A mixture of 380 g of aqueous 39% strength by weight formaldehyde solution, 10 g of ethylene glycol, 20 g of methanol, 10 g of sugar and 6 g of a 40% strength by weight solution of sodium sulphamate is adjusted to a pH value of 10.1 by adding 27% strength sodium hydroxide solution, and 330 g of melamine are added, while stirring. This mixture is heated to 90° C. and subjected to a condensation reaction until a dilutability with water of 1:1.5 is reached. After cooling to 50° C., 40 g of the modifying product according to Example 1b) and 150 g of water are added. The content of modifying agent according to Example 1b) in the resin solution is 5.3% by weight, relative to solid resin.

0.4%, relative to solid resin, of curing agent is added to this resin solution. A decorative 80 g/m² paper is impregnated as under 1.1 in this solution and is pressed onto wood particle board in accordance with 1.1.3. The surfaces of the particle board thus coated are well cured and exhibit a uniform high gloss and remain free from cracks after heat treatment for 20 hours at 80° C.

EXAMPLE 5

A mixture of 36.0 kg of aqueous 39% strength by weight formaldehyde solution, 2.7 kg of diethylene glycol, 1.0 kg of methanol, 2.2 kg of sodium sulphamate, 3.7 kg of sugar and 15.0 kg of water is adjusted to a pH value of 10.1 with dimethylaminoethanol and 32 kg of melamine are added. This mixture is subjected to a condensation reaction at 90° C. until a dilutability with water of 1:2.0 is reached, and is cooled to 30° C. and 5 kg of water are added. 7.5% (this being relative to solid resin) of modifying agent according to Example 1b) are then added.

5.1 0.9% by weight, relative to solid resin, of curing agent was added to this resin solution. An 80 g/m² paper is impregnated in accordance with 1.1 in the resin solution thus obtained and wood particle board is coated with the impregnated paper as in 1.1.2. The surfaces of the coated board have a very high gloss and are well cured and remain free from cracks.

5.2 0.4% by weight, relative to solid resin, of curing agent was added to the resin solution of Example 5 and further processing was carried out in accordance with Example 1.1.3. The surfaces of the wood particle board thus coated are very well cured and exhibit a uniform high gloss and remain free from cracks after heat treatment for 20 hours at 80° C.

EXAMPLE 6

552 g of 39% strength by weight aqueous formaldehyde, 540 g of melamine, 140 g of water, 30 g of diethylene glycol, 7 g of methanol, 15 g of caprolactam, 20 g of 40% strength by weight aqueous sodium sulphamate solution and 3 g of dimethylethanolamine are heated to 90° C. in the course of 30 to 40 minutes and are subjected to a condensation reaction at this temperature until a dilutability with water of 1:1.5 is reached (duration approx. 4 hours). The pH value of the solution should be 10.0±0.2. After cooling to 30° C., the base resin thus obtained can be mixed with the polyesters prepared in accordance with Examples 1b), 2b) or 7, or with a polyester in Table 1 to give a modified aminoplast resin according to the invention which also produces very elastic surfaces of high gloss, even at a high degree of curing, and liberates little formaldehyde when processed and has very good stability on storage.

Similarly good results are obtained if, analogously to the above instructions, 552 g of 39% strength by weight aqueous formaldehyde, 560 g of melamine, 170 g of water, 30 g of diethylene glycol, 7 g of methanol, 15 g of caprolactam, 20 g of 40% strength by weight aqueous Na sulphamate solution and 3 g of dimethylethanolamine are subjected to a condensation reaction until a dilutability with water of 1:1.5 is reached or 780 g of 39% strength by weight aqueous formaldehyde, 850 g of melamine, 200 g of water, 60 g of diethylene glycol, 20 g of caprolactam, 10 g of 40% strength by weight aqueous Na sulphamate solution and 3 g of dimethylethanolamine are subjected to a condensation reaction until a dilutability with water of 1:1.0 is reached, and if the products thus obtained are employed as the base resins.

EXAMPLE 7

350 g (3.3 mols) of diethylene glycol, 186.8 g (1.125 mols) of 99% strength isophthalic acid and 227.25 g (5.125 mols) of sebacic acid are heated to 190° C. in the course of one hour under nitrogen, in a 2 l four-necked flask with ground joints equipped with a stirrer, thermometer, a gas inlet tube for nitrogen and a descending condenser, and are heated to 200° C. in the course of a second hour and then kept at 200°–205° C. for a further hour. A clear solution is obtained and a total of about 62 g of water is collected in the receiver. The melt is then cooled to 170° C., 144 g (0.75 mol) of citric acid are stirred in and the mixture is again heated to 200° C. until the acid number is 88 (which takes about 1 hour). In the course of this approx. 35 g of water are again removed by distillation, and the branched polyester is obtained as the residue in the form of 790 g of a pale melt. Its average molecular weight is 1010. It is diluted with 240 g of distilled water and neutralised to pH 7 with 99 g of dimethylethanolamine. Yield: 1129 g of a clear, pale, viscous 70% strength solution. When combined with the base resins described in the preceding examples, the polyester thus obtained gives modified resins according to the invention which have very good stability and liberate little formaldehyde when processed, and which enable coatings of an outstandingly high gloss and a very great reserve of resilience to be produced, even at a high degree of curing, both in multi-daylight presses and by the quick-cycling process.

Similarly good results are obtained if the polyesters listed in the table which follows are used as modifying agents according to the invention.

The figure quoted in the column "Increase in gloss" relates to the comparison of the appropriate resin according to the invention with a commercial melamine resin which has been modified with caprolactam/diethylene glycol.

TABLE

| | Polyesters as modifying agents according to the invention | | | | | | | | |
|---|---|---|---|---|---|---|---|---|---|
| No. | Dicarboxylic acid components | Mol % | Diol components | Mol % | Acid number | Average molecular weight | Increase in gloss [%] | Crack test 140° C. | Kiton test |
| 1 | Isophthalic acid<br>Sebacic acid<br>Trimellitic anhydride | 37.5<br>37.5<br>25 | Diethylene glycol | 110 | 96 | 1270 | 27% | satisfactory | 2 |
| 2 | Isophthalic acid<br>Phthalic anhydride<br>Pyromellitic anhydride | 40<br>40<br>20 | Diethylene glycol | 110 | 116 | 770 | 18% | satisfactory | 2–3 |
| 3 | Isophthalic acid<br>Phthalic anhydride<br>Trimellitic anhydride | 40<br>40<br>20 | Diethylene glycol | 110 | 89 | 780 | 21% | satisfactory | 2–3 |
| 4 | Dimethyl terephthalate | 37.5 | Diethylene glycol | 110 | 74 | 800 | 23% | satis- | 2 |

TABLE-continued

| | Polyesters as modifying agents according to the invention | | | | | | | | |
|---|---|---|---|---|---|---|---|---|---|
| No. | Dicarboxylic acid components | Mol % | Diol components | Mol % | Acid number | Average molecular weight | Increase in gloss [%] | Crack test 140° C. | Kiton test |
| | Dimethyl cyclohexanedi-carboxylate | 37.5 | | | | | | factory | |
| | Trimellitic anhydride | 25 | | | | | | | |
| 5 | Phthalic anhydride | 72.7 | Diethylene glycol | 70 | 91.9 | 890 | 24% | satis-factory | 3 |
| | Trimellitic anhydride | 27.3 | Ethylene glycol | 30 | | | | | |
| 6 | Isophthalic acid | 37.5 | Diethylene glycol | 110 | 88 | 1010 | 29% | satis-factory | 2–3 |
| | Sebacic acid | 37.5 | | | | | | | |
| | Citric acid | 25 | | | | | | | |
| 7 | Isophthalic acid | 40 | Diethylene glycol | 95 | 90 | 1000 | 22% | satis-factory | 2–3 |
| | Sebacic acid | 40 | Hexane-1, 6-diol | 15 | | | | | |
| | Citric acid | 20 | | | | | | | |
| 8 | Isophthalic acid | 72.7 | Diethylene glycol | 100 | 89.9 | 1030 | 18% | satis-factory | 3 |
| | Trimellitic anhydride | 27.3 | | | | | | | |
| 9 | Phthalic anhydride | 72.7 | Diethylene glycol | 70 | 91.2 | 870 | 18% | satis-factory | 3 |
| | Trimellitic anhydride | 27.3 | Hexane-1, 6-diol | 30 | | | | | |
| 10 | Phthalic anhydride | 50 | Diethylene glycol | 80 | 80 | 950 | 25% | satis-factory | 2 |
| | Succinic anhydride | 50 | Trimethylol-propane | 40 | | | | | |
| 11 | Isophthalic acid | 75 | Diethylene glycol | 75 | 127 | 900 | 33% | satis-factory | 2 |
| | Trimellitic anhydride | 25 | Glycerol | 25 | | | | | |
| 12 | Isophthalic acid | 90 | Diethylene glycol | 80 | 55 | 710 | 28% | satis-factory | 2 |
| | Terephthalic acid | 10 | Trimethylol-ethane | 40 | | | | | |
| 13 | Isophthalic acid | 75 | Diethylene glycol | 110 | 105 | 870 | 26% | satis-factory | 2–3 |
| | Trimellitic anhydride | 25 | | | | | | | |
| 14 | Phthalic anhydride | 72.7 | Diethylene glycol | 70 | 93.7 | 840 | 10% | satis-factory | 3 |
| | Trimellitic anhydride | 27.3 | Bis-hydroxymethyl-cyclohexane | 30 | | | | | |
| 15 | Phthalic anhydride | 100 | Diethylene glycol | 60 | 75 | 800 | 24% | satis-factory | 2–3 |
| | | | Dipentaerythritol | 30 | | | | | |
| 16 | Isophthalic acid | 37.5 | Diethylene glycol | 40 | 90 | 1050 | 22% | satis-factory | 2–3 |
| | Sebacic acid | 37.5 | Triethylene glycol | 40 | | | | | |
| | Trimellitic anhydride | 25 | Ethylene glycol | 30 | | | | | |
| 17 | Isophthalic acid | 70 | Diethylene glycol | 105 | 102 | 850 | 20% | satis-factory | 2–3 |
| | Trimellitic anhydride | 25 | | | | | | | |
| | Lactic acid | 5 | | | | | | | |
| 18 | Isophthalic acid | 35 | Ethylene glycol | 10 | 75 | 950 | 23% | satis-factory | 2–3 |
| | Sebacic acid | 25 | Diethylene glycol | 50 | | | | | |
| | Trimellitic anhydride | 20 | Triethylene glycol | 40 | | | | | |
| | p-(β-Hydroxyethoxy)-benzoic acid | | | | | | | | |

What is claimed is:

1. Modified aminoplast resin comprising
    (a) 85 to 97.5% by weight of an aminoplast precondensate which has been etherified with a lower alkanol to an extent not exceeding 10% and
    (b) 2.5 to 15% by weight of a modifying agent which comprises a mixture of:
        (i) a water-soluble polyester prepared from carboxylic acids with at least one carboxyl and an alcohol with at least two hydroxyls, and
        (ii) sufficient free diol or polyol whereby the mixture has a ratio of the sum of free and esterified hydroxyls of 0.8 to 4.5 moles for each mole of the sum of free and esterified carboxyls, wherein the polyester of said modifying agent is a polyester comprising structural units selected from the formula:

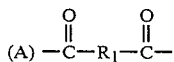

and $$-O-R_2-O- \qquad (B)$$

wherein
    $R_1$ is a divalent hydrocarbyl moiety,
    $R_2$ is divalent moiety having as a statistical average, 40–100 mole % of structural units of the formula $CH_2-CH_2-O-CH_2CH_2-$, $CH_2-CH_2-O-CH_2CH_2-O-CH_2CH_2-$ or mixtures thereof,
and said polyester has an acid number of 15 to 150.

2. Modified aminoplast resin according to claim 1 wherein the polyester of said modifying agent comprises structural units selected from the formula

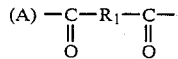

and $$-O-R_2-O- \qquad (B)$$

together with one or more units of the formulae

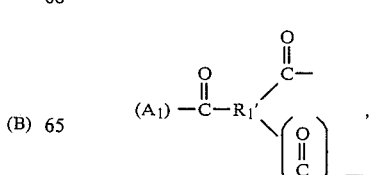

-continued (A$_2$) 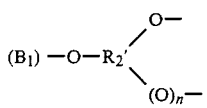  and (B$_1$) —O—R$_2'$⟨O—/(O)$_n$—⟩ wherein

R$_1$ is a divalent hydrocarbyl moiety, m is the number 1 or 2,

R$_1'$ is a hydrocarbyl moiety which is trivalent when m is 1 and is tetravalent when m is 2, R$_1''$ is a monovalent hydrocarbyl moiety, R$_2$ is divalent moiety having as a statistical average, 40–100 mole % of structural units of the formula CH$_2$—CH$_2$—O—CH$_2$CH$_2$—, CH$_2$—CH$_2$—O—CH$_2$CH$_2$—O—CH$_2$CH$_2$— or mixtures thereof, n is a number from 1 to 6, and R$_2'$ is a saturated aliphatic or cycloaliphatic moiety which is trivalent when n is 1, is tetravalent when n is 2 and is pentavalent when n is 3;

and said polyester has an acid number of 15 to 150.

3. Modified aminoplast according to claim 1 wherein said aminoplast precondensate is a melamine-formaldehyde precondensate, ureaformaldehyde precondensate or a mixture thereof.

4. Modified aminoplast according to claim 3 wherein said aminoplast precondensate contains 1.3 to 3 moles formaldehyde per mole of melamine, urea or a mixture thereof.

5. Modified aminoplast according to claim 1 wherein said modifying agent has an acid number of 30 to 150.

6. Modified aminoplast according to claim 2 wherein said polyester in said modifying agent contains, relative to 100 mole % of the sum of the units A, A$_1$ and A$_2$, 80 to 180 mole % of the sum of the units B and B$_1$.

7. Modified aminoplast according to claim 6 wherein said polyester in said modifying agent contains, relative to 100 mole % of the sum of the units radicals A, A$_1$ and A$_2$, up to 40 mole % of A$_1$.

8. Modified aminoplast according to claim 7 wherein said polyester in said modifying agent contains, relative to 100 mole % of the sum of the units radicals B and B$_1$, up to 50 mole % of B$_1$.

9. Modified aminoplast according to claim 8 wherein said polyester in said modifying agent contains, relative to 100 mole % of the sum of the units A, A$_1$ and A$_2$, at least 40 mole % of unit A of the formula

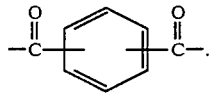

10. Modified aminoplast according to claim 9 wherein said polyester in said modifying agent contains, relative to 100 mole % of the sum of the units B and B$_1$, at least 40 mole % of unit B of the formula —O—CH$_2$CH$_2$—O—CH$_2$CH$_2$—O—, —O—CH$_2$CH$_2$—O—CH$_2$CH$_2$—O—CH$_2$CH$_2$—O— or a mixture thereof.

11. Process for the preparation of a modified aminoplast comprising, for each 100 parts by weight of modified aminoplast, mixing 0.5 to 40 parts by weight of a modifying agent as defined in claim 1 with 60 to 99.5 parts by weight of an aminoplast precondensate which has been methyl etherified to an extent not exceeding 10%, said modifying agent being mixed before, during or after its preparation by condensation of carboxylic acid and alcohol.

12. In the production of coated wood-based materials and laminated plastics by applying a coating of an aminoplast resin, the improvement comprises said aminoplast resin being a modified aminoplast resin according to claim 1.

* * * * *